US008788316B1

(12) United States Patent
Karnik et al.

(10) Patent No.: US 8,788,316 B1
(45) Date of Patent: Jul. 22, 2014

(54) USAGE LICENSE

(75) Inventors: Amol M. Karnik, Brookline, MA (US); Christopher Hallgren, Somerville, MA (US); Loren Dean, Natick, MA (US); Jocelyn Luke Martin, Burwell (GB)

(73) Assignee: The MathWorks, Inc., Natick, MA (US)

( * ) Notice: Subject to any disclaimer, the term of this patent is extended or adjusted under 35 U.S.C. 154(b) by 176 days.

(21) Appl. No.: 13/312,628

(22) Filed: Dec. 6, 2011

Related U.S. Application Data

(60) Provisional application No. 61/494,270, filed on Jun. 7, 2011, provisional application No. 61/494,259, filed on Jun. 7, 2011.

(51) Int. Cl.
*G06Q 10/00* (2012.01)
*G06Q 30/00* (2012.01)
*G06F 17/00* (2006.01)
*G06G 7/00* (2006.01)
*G06Q 30/02* (2012.01)

(52) U.S. Cl.
CPC ........ *G06Q 30/0206* (2013.01); *G06Q 30/0283* (2013.01)
USPC ....................................... 705/7.35

(58) Field of Classification Search
CPC ................ G06Q 30/0206; G06Q 30/0283
USPC .................................. 705/7.35, 400
See application file for complete search history.

(56) References Cited

U.S. PATENT DOCUMENTS

| | | | |
|---|---|---|---|
| 7,752,138 B1 | 7/2010 | Dean et al. | |
| 2004/0225898 A1* | 11/2004 | Frost et al. | 713/201 |
| 2007/0066490 A1* | 3/2007 | Gemelos et al. | 505/100 |
| 2009/0119779 A1 | 5/2009 | Dean et al. | |

* cited by examiner

*Primary Examiner* — Allen J Jung
(74) *Attorney, Agent, or Firm* — Harrity & Harrity, LLP

(57) ABSTRACT

A system is configured to receive a task. The task is received over a first network, includes authentication credentials, and is processed using an application. The system is further configured to send the authentication credentials to a licensing server. The authentication credentials are sent over a second network, and are sent prior to processing the task using the application. The system is also configured to receive an authorization. The authorization is received over the second network, and authorizes the application to process the task.

50 Claims, 16 Drawing Sheets

USAGE LICENSE

REFERENCE TO RELATED APPLICATIONS

This application also claims priority to U.S. Provisional Patent Application No. 61/494,270, filed on Jun. 7, 2011, and to U.S. Provisional Patent Application No. 61/494,259, filed on Jun. 7, 2011. The contents of all the aforementioned applications are incorporated by reference.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Embodiments described herein may allow a worker to receive a request to use an instance of software to process a task based on a license associated with a licensee. The license may provide a pay-per-usage model that allows the licensee to pay for the use of the additional instance of software based on an amount (e.g., a period of time) of the use. The worker may request and receive, from a licensing server, authorization to process the task based on the license. Once authorized to process the task, the worker may continuously transmit, to the licensing server, heartbeats that indicate that the worker is continuing to process the task based on the license. The licensing server may determine whether the worker is allowed to continue to process the task based on a usage amount associated with the license. The licensing server may terminate processing of the task, by the worker, when the usage amount exceeds an account value (e.g., a usage account value) associated with the license.

Example Environment

Figure 1:
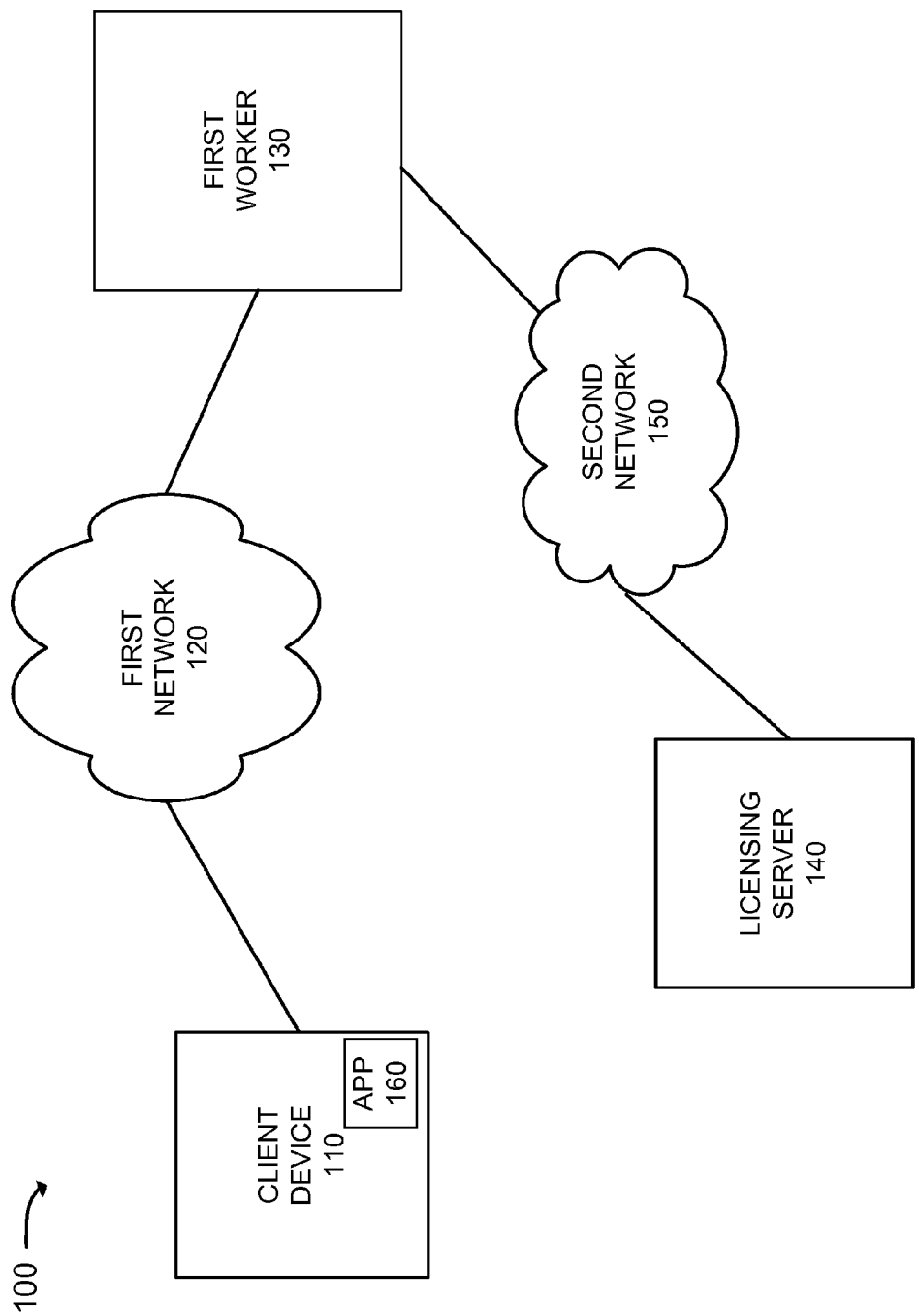
FIG. 1 is a diagram of an example environment in which systems and/or methods described herein may be implemented.

FIG. 1 is a diagram of an example environment 100 in which systems and/or methods described herein may be implemented. Environment 100 may include one or more of the following components: a client device 110, a first network 120, a first worker 130, a licensing server 140, and a second network 150. In practice, environment 100 may include additional components, fewer components, different components, or differently arranged components than are shown in FIG. 1. Additionally, or alternatively, one or more of the components of environment 100 may perform one or more functions described as being performed by another one or more of the components of environment 100.

Furthermore, two or more of the components, of FIG. 1, may be implemented within a single device, or a single component may be implemented as multiple, distributed devices. Also, components of environment 100 may interconnect via wired and/or wireless connections. In other words, any two components, of environment 100, may communicate via a wired connection, a wireless connection, or a combination of a wired connection and a wireless connection.

Client device 110 may include a computation and/or communication device, such as a device that is capable of invoking one or more workers for performing a job. In one implementation, client device 110 may take the form of a computer, including a web service terminal, a personal computer, a laptop, a tablet computer, a smart phone, a mobile telephone device, a personal digital assistant (PDA), etc.

Client device 110 may execute an application 160. A user of client device 110 may use application 160 to create a task. The task may include, for example, executing a model (e.g., created by the user utilizing application 160), determining a solution to a problem, and/or another collection of computation tasks. In some instances, client device 110 may determine that client device 110 requires an additional instance of application 160 to process the task (e.g., to generate a result within a certain period of time). In other instances, the user may request that client device 110 use an additional instance of application 160 to process the task.

In one implementation, client device 110 may request authorization from licensing server 140 to use the other instance of application 160 to process the task. In another implementation, client device 110 may transmit the task to first worker 130 via first network 120, and first worker 130 may request, from licensing server 140, authorization to use an instance of application 160.

Each one of first network 120 and second network 150 may include a single network or multiple networks of a same type or different types. For example, first network 120 and/or second network 150 may include a direct connection between devices, a local area network (LAN), a wide area network (WAN) (e.g., the Internet), a metropolitan area network (MAN), a wireless network (e.g., a general packet radio service (GPRS) network), a telephone network (e.g., a Public Switched Telephone Network and/or a cellular network), a subset of the Internet, an ad hoc network, or any combination of the aforementioned networks.

In one implementation, first network 120 and/or second network 150 may include a cloud and/or a private network that provides computational resources on demand. In another implementation, first network 120 and/or second network 150 may include a public network, an insecure network, etc.

First worker 130 may be part of a group of workers that make up a distributed computing system (DCS) and/or a parallel computing system. First worker 130 may include an autonomous computer device that communicates with other workers via first network 120. First worker 130 may process a task (e.g., solve a computational problem) that has been provided by client device 110.

Licensing server 140 may include a computation and/or communication device, such as a device that is capable of communicating with first worker 130, network 150, etc. Licensing server 140 may represent a single server device or multiple server devices and/or computer systems. As described further below in reference to FIG. 4, licensing server 140 may store license information associated with a license. Licensing server 140 may provide authentication credentials to client device 110 to grant client device 110 an additional instance of application 160 based on a license associated with the authentication credentials. Licensing server 140 may also provide authorizations, in response to authorization requests that include the authentication credentials, to client device 110 and/or first worker 130 to use an additional application 160 to process tasks created by client device 110.

Example Components of a Device

Figure 2:
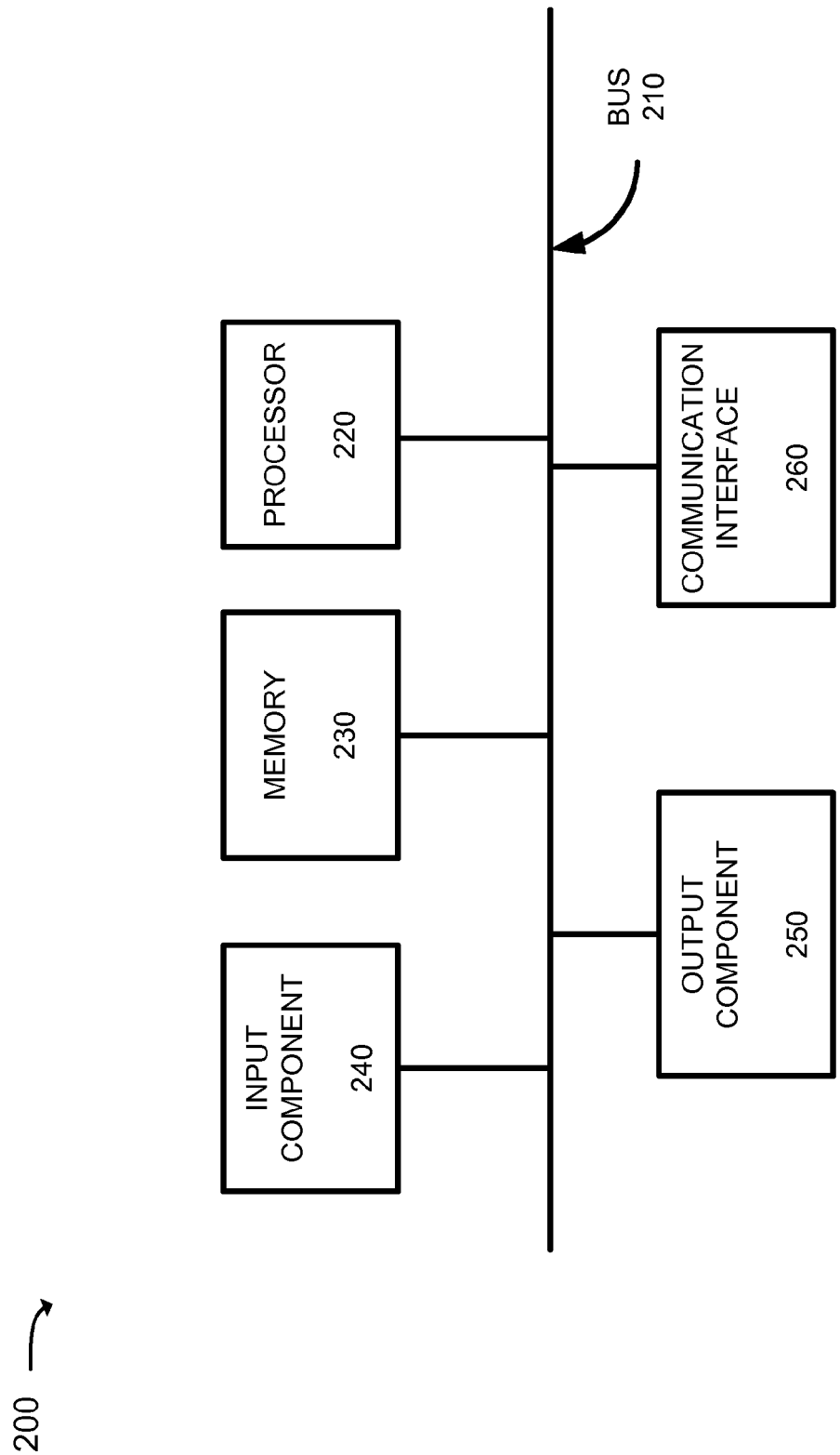
FIG. 2 is a diagram of example components of one or more devices of FIG. 1.

FIG. 2 is a diagram of example components of a device 200 that may correspond to client device 110, first worker 130, and/or licensing server 140. Each one of client device 110, nodes 130, and/or licensing server 140 may include one or more devices 200.

As shown in FIG. 2, device 200 may include a bus 210, a processor 220, a memory 230, an input component 240, an output component 250, and a communication interface 260. In another implementation, device 200 may include additional components, fewer components, different components, and/or differently arranged components than are shown in FIG. 2. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include a dynamic storage device that may store information and instructions for execution by processor 220, and/or a type of non-volatile storage device that may store information for use by processor 220.

Input component 240 may include one or more input mechanisms that permit a user to input information to device 200. Output component 250 may include one or more output mechanisms that output information to the user. Examples of input and output mechanisms may include buttons; a touch screen interface to permit data and control commands to be input into device 200; a speaker to receive electrical signals and output audio signals; a microphone to receive audio signals and output electrical signals; a display to output visual information; etc.

Communication interface 260 may include any transceiver-like mechanism that enables device 200 to communicate with other devices and/or systems. For example, communication interface 260 may include an Ethernet interface, an optical interface, a coaxial interface, a wireless interface, or the like.

Device 200 may perform certain operations described herein. Device 200 may perform these operations in response to processor 220 executing software instructions (e.g., computer program(s)) contained in a computer-readable medium, such as memory 230, a secondary storage device (e.g., hard disk, CD-ROM, etc.), or other forms of random-access memory (RAM) or read-only memory (ROM). A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Example Functional Components of Worker

Figure 3:
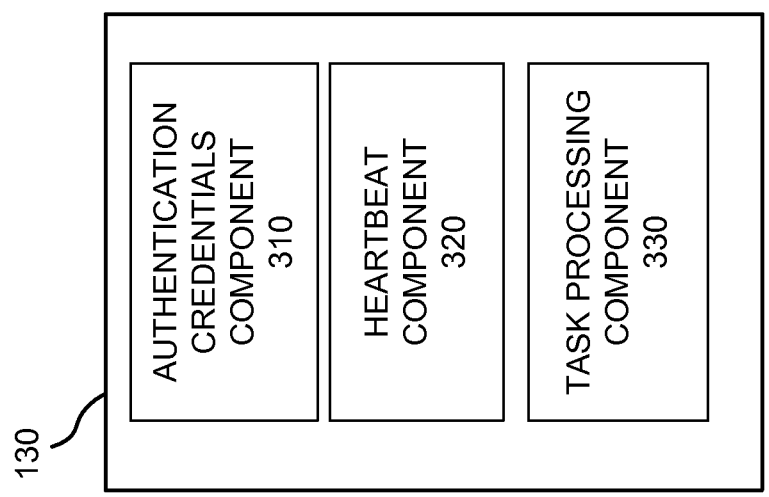
FIG. 3 is a diagram of example functional components of a worker of FIG. 1.

FIG. 3 is a diagram of example functional components of first worker 130. As shown in FIG. 3, first worker 130 may include an authentication credentials component 310, a heartbeat component 320, and/or a task processing component 330. In practice, first worker 130 may include additional functional components, fewer functional components, and/or different functional components than are shown in FIG. 3.

Authentication credentials component 310, heartbeat component 320, and/or task processing component 330 may be implemented using one or more of the components of device 200 of FIG. 2. For example, authentication credentials component 310, heartbeat component 320, and/or task processing component 330 may be implemented via processor 220 executing instructions stored in memory 230.

Authentication credentials component 310 may receive authentication credentials from client device 110. In one implementation, authentication credentials component 310 may receive the authentication credentials with a task provided by client device 110. Alternatively, authentication credentials component 310 may receive the authentication credentials at another time. For example, authentication credentials component 310 may, in response to receiving a task from client device 110, request the authentication credentials from client device 110.

In any event, authentication credentials component 310 may generate an authorization request that includes the authentication credentials. Authentication credentials component 310 may transmit the authorization request to licensing server 140. Authentication credentials component 310 may receive, from licensing server 140 and when the authentication credentials have been properly authorized, an authorization in response to the authorization request. When authentication credentials component 310 receives the authorization, authentication credentials component 310 may instruct heartbeat component 320 to begin transmitting heartbeats to licensing server 140, and may instruct task processing component 330 to begin processing the task.

Heartbeat component 320 may transmit heartbeats to licensing server 140 while task processing component 330 is processing the task. For example, heartbeat component 320 may generate a heartbeat, and may transmit the heartbeat to licensing server 140. Heartbeat component 320 may receive, from licensing server 140, a heartbeat response in response to the heartbeat. Heartbeat component 320 may periodically (e.g., every 1 minute) send a new heartbeat to licensing server 140. A heartbeat may directly or indirectly indicate a status or a state of first worker 130. In one implementation, a heartbeat may indicate that task processing component 330 is processing the task. In another implementation, a heartbeat may include a ping that does not include any content. In yet another implementation, a heartbeat may include a message that includes content. Licensing server 130 may process the content to determine information about first worker 130. For example, a heartbeat may include usage information that may be used to calculate an amount of the processing (e.g., a period of time spent by task processing component 330 to process the task).

Heartbeat component 320 may determine whether task processing component 330 is authorized to continue to process the task. When heartbeat component 320 determines that task processing component 330 is not authorized to continue to process the task, heartbeat component 320 may instruct task processing component 330 to terminate processing of the task. When heartbeat component 320 determines that task processing component 330 is authorized to continue to process the task, heartbeat component 320 may generate a new heartbeat, and may transmit the new heartbeat to licensing server 140.

Task processing component 330 may process the task. For example, task processing component 330 may initialize an application to process the task after receiving the instructions to begin processing the task from authentication credentials component 310. Task processing component 330 may use the application to process the task until the task is processed or until receiving the instruction to terminate the processing of the task from heartbeat component 320. Task processing component 330 may further generate a result based on the processing of the task, and may transmit the result to client device 110.

Example Functional Components of Licensing Server

Figure 4:
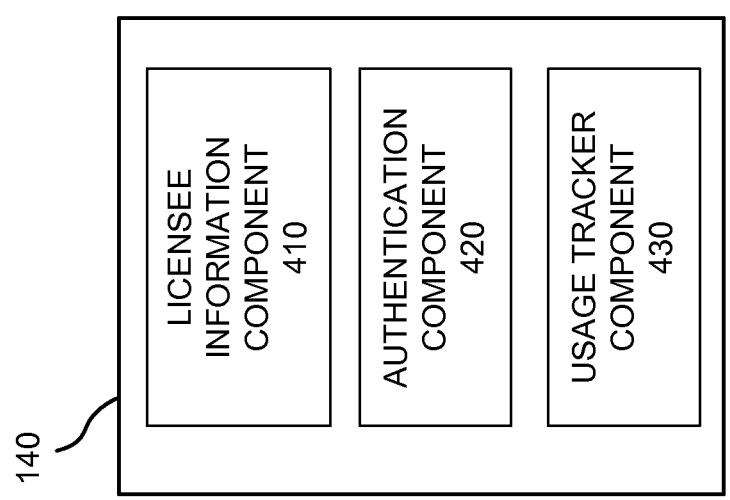
FIG. 4 is a diagram of example functional components of a licensing server of FIG. 1.

FIG. 4 is a diagram of example functional components of licensing server 140. As shown in FIG. 4, licensing server 140 may include a licensee information component 410, an authentication component 420, and/or a usage tracker component 430. In practice, licensing server 140 may include additional functional components, fewer functional components, and/or different functional components than are shown in FIG. 4. Licensee information component 410, authentication component 420, and/or usage tracker component 430 may be implemented using one or more of the components of device 200 of FIG. 2. For example, licensee information component 410, authentication component 420, and/or usage tracker component 430 may be implemented via processor 220 executing instructions stored in memory 230.

Licensee information component 410 may store information about licenses that are associated with licensees (e.g., client device 110 or a user of client device 110) and that permit the licensees to use instances of applications. For example, an operator of licensing server 140 may enter information about licensees into licensee information component 410. The information may include, for example, an identifier associated with a licensee, authentication credentials (e.g., a username, a password, a digital certificate, etc.) used to authenticate the licensee, authentication information (e.g., a token) that a worker has to provide to receive authorization to process a task for the licensee, information identifying an application that may be used to process a task based one license of the licensee, terms of the license, an account value associated with the license, a total usage amount that represents an amount of processing performed by the worker based on the license, etc. Licensee information component 410 may include one or more data structures, database records, files, etc., residing in a computer-readable storage medium. Licensee information component 410 may be configured to provide licenses to licensees over a network, such as first network 120 or second network 150.

Authentication component 420 may provide authorization to allow a worker, such as first worker 130, to initialize an application to process a task. For example, authentication component 420 may receive an authorization request from first worker 130 to process a task received from client device 110. The authorization request may include authentication credentials.

Authentication component 420 may determine, based on the authentication credentials, whether first worker 130 is authorized to use a particular application to process the task based on a license associated with client device 110 or a user of client device 110. If properly authenticated, authentication component 420 may transmit an authorization to first worker 130 to authorize first worker 130 to process the task.

In one implementation, when authentication component 420 determines that first worker 130 is authorized to use a particular application to process the task, licensing server 140 may check-out a license to first worker 130 to be used to process the task. First worker 130 may spawn a new process, based on the license, to use the particular application to process the task. When first worker 130 determines that the particular application exits, first worker 130 may check-in the license back to licensing server 140. The particular application may exit, for example, when the particular application finishes completing the task or when the particular application crashes. Additionally, or alternatively, licensing server 140 may check-in the license when licensing service 140 determines that first worker 130 and/or the particular application crashes.

Usage tracker component 430 may track an amount of processing performed by a worker based on a license. For example, usage tracker component 430 may receive a heartbeat from first worker 130. Usage tracker component 430 may determine usage information based on the heartbeat. The usage information may include, for example, an amount of time and/or another type of information used to measure processing performed by first worker 130. Usage tracker component 430 may determine a total usage amount based on the usage information. Usage tracker component 430 may update the total usage amount based on subsequently received heartbeats. Usage tracker component 430 may determine, based on the updated total usage amount, whether first worker 130 is allowed to continue processing the task associated with the usage license. Usage tracker component 430 may transmit, to first worker 130, a heartbeat response in response to the heartbeat. The heartbeat response may indicate whether first worker 130 is allowed to continue to use the particular application to process the task based on the license. For example, a heartbeat response may include instructions to terminate the processing of the task, by first worker 130, when usage tracker component 430 determines that the total usage amount has reached a particular threshold associated with the license.

In one implementation, licensing server 140 may generate a heartbeat response that includes a remote kill. In one example, licensing server 140 may include the remote kill in the heartbeat response when the updated total usage amount is greater than the particular threshold.

In another example, licensing server 140 may include the remote kill in the heartbeat response based on change(s) in other value(s) associated with the usage license. For example, licensing server 140 may include the remote kill in the heartbeat response when a value associated with the usage license indicates that the licensee associated with the usage license has not paid a bill per the usage license. In yet another example, licensing server 140 may include remote kill in the heartbeat response based on instructions from an administrator of the usage license (e.g., an operator of licensing server 140). The instructions may, for example, instruct licensing server 140 to terminate processing by workers, including first worker 130, based on the usage license or for the licensee.

In another implementation, licensing server 140 may generate a heartbeat response that includes instructions for sending heartbeats to licensing server 140. In one example, the instructions may include an interval at which future heartbeats should be sent from first worker 130 to licensing server 140. In another example, the instructions may specify a downtime during which heartbeats should not be sent from first worker 130 to licensing server 140. For example, licensing server 140 may receive information from, for example, an operator of licensing server 140 that indicates that licensing server 140 will not be able to receive heartbeats and/or transmit heartbeat responses (e.g., because licensing server 140 will be shut down and/or undergoing maintenance) during a particular period of time. In response to the information, licensing server 140 may generate a heartbeat response that includes instructions for first worker 130 not to send heartbeats to licensing server 140 during the particular period of time.

Example Processes

Figure 5:
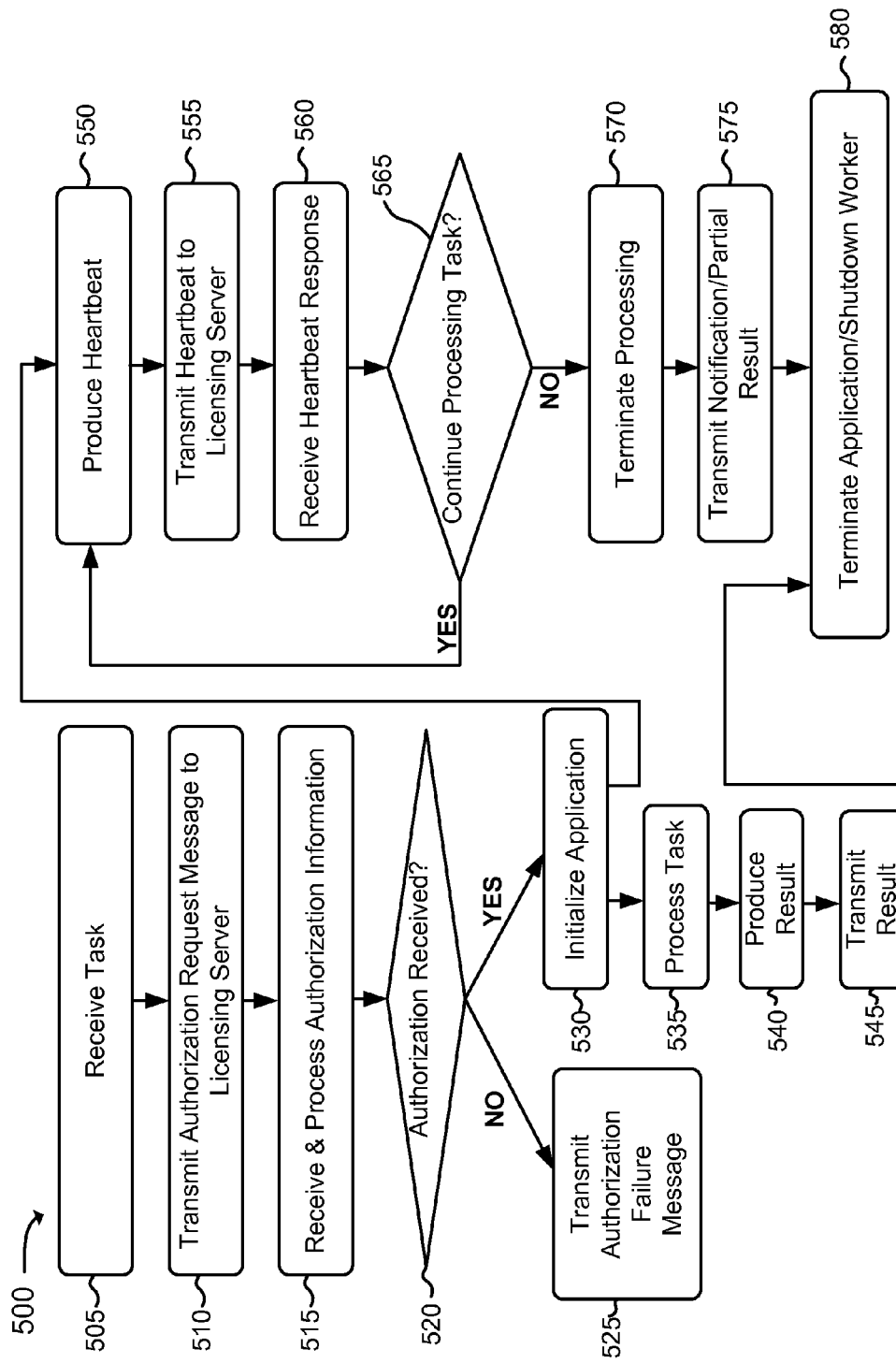
FIG. 5 is a flowchart of an example process for processing a task based on a license.

FIG. 5 is a flowchart of an example process 500 for processing a task based on a license. In one implementation, first worker 130 may perform process 500. In another implementation, a device or collection of devices separate from, or in combination with, first worker 130 may perform some or all of process 500. For example, client device 110 may act as first worker 130, and may perform some or all of process 500. In addition, other implementations of process may include fewer blocks, additional blocks, blocks in orders differing from those of FIG. 5 if desired. In addition, blocks in FIG. 5 can be combined without departing from the spirit and scope of the invention.

As shown in FIG. 5, process 500 may include receiving a task (block 505). In one implementation, prior to process 500, client device 110 may initiate a process to use additional processing power to process a task. First worker 130 may receive the task from client device 110 via first network 120. First worker 130 may receive the task based on client device 110 interacting with a web service. In another implementation, first worker 130 may receive the task from another worker. In yet another implementation, first worker 130 may receive the task from a scheduler operating on behalf of client device 110 or the other worker.

In one example, the task may include authentication credentials and/or identify a particular license to be used to process the task. As indicated above, the authentication credentials associated with client device 110 or a user of client device 110. In another example, authentication credentials component 310 (FIG. 3), of first worker 130, may programmatically generate the authentication credentials based on information included in the task. The authentication credentials may include a user name, a password, a token, a digital certificate, a biometric identifier, and/or other types of information. The authentication credentials may be received by using a standard protocol. The standard protocol may include, for example, a hypertext transfer protocol (http) or a hypertext transfer protocol secure (https).

Process 500 may further include transmitting an authorization request message to a licensing server (block 510), receiving and processing authorization information (block 515), and determining whether authorization is received (block 520). For example, authentication credentials component 310 may generate an authorization request message. The authorization request message may include the authentication credentials. Authentication credentials component 310 may transmit the authorization request message to licensing server 140 via second network 150. Authentication credentials component 310 may transmit the authorization request message by using, for example, a secure communications protocol, a web service, or a remote method invocation (RMI).

In one implementation, the authorization request message may be sent on behalf of the application to be used to process the task. Authentication credentials component 310 may receive, from licensing server 140 and via second network 150, authorization information in response to the authorization request message. Authentication credentials component 310 may process the authorization information to determine whether first worker 130 is authorized to use the application to process the task.

If the authentication information indicates that the worker is not authorized to use the application (block 520—NO), process 500 may include transmitting an authorization failure message (block 525). For example, authentication credentials component 310 may determine that the authentication information indicates that first worker 130 is not authorized to use the application when the authorization information indicates that the first worker 130 is not authorized to use the application to process the task. When the authorization is not received, authentication credentials component 310 may transmit an authorization failure message to client device 110. The authorization failure message may indicate that licensing server 140 did not authorize first worker 130 to process the task based on the license associated with the authentication credentials.

In another implementation, authentication credentials component 310 may determine at the first worker 130 is not authorized to use the application to process the task because first worker 130 is not authorized to process tasks of a particular type of the task. For example, first worker 130 may only process academic tasks. The task may be a corporate task. Authentication credentials component 310 may determine that first worker 130 is not authorized to process the task because the task is not an academic type of task. In this example, first worker 130 may forward the task to another worker that processes corporate tasks. In yet another implementation, licensing server 140 may forward the task from first worker 130 to the other worker that processes corporate tasks.

If the authentication information indicates that the worker is authorized to use the application (block 520—YES), process 500 may include initializing the application (block 530). For example, authentication credentials component 310 may determine that the authentication information indicates that first worker 130 is authorized to use the application when the authorization information indicates that first worker 130 is authorized to use the application to process the task. When the authorization is received, task processing component 330 (FIG. 3), of first worker 130, may initialize the application, for processing the task, in accordance with the license associated with the authentication credentials.

Alternatively, first worker 130 may initialize the application before or during the transmission of the authorization request message. For example, first worker 130 may use the application to transmit the authorization request message (block 510) and/or to receive and process the authorization information (block 515). First worker 130 may use the application to process the task only after the authorization is received.

Process 500 may also include processing the task (block 535), producing a result (block 540), and transmitting the result (block 545). For example, after first worker 130 receives the indication from licensing server 140 that first worker 130 is authorized to use the application to process the task, task processing component 330 may use the application to process the task.

Additionally, or alternatively, processing the task may include transmitting a sub-task, of the task, to a different worker for the different worker to use a different application to process the sub-task on behalf of the application of first worker 130. The request may include the authentication credentials. The different worker may process the sub-task after receiving authorization to process the sub-task from licensing server 140. First worker 130 may receive, from the different worker, the result from processing the sub-task.

In either event, task processing component 330 may produce a result. The result may be based on processing performed by first worker 130 and, when used, one or more different workers. First worker 130 may transmit the produced result to client device 110.

While initializing and/or processing the task (block 535), process 500 may include producing a heartbeat (block 550), transmitting the heartbeat to the licensing server (block 555), receiving a heartbeat response (block 560), and determining whether to continue processing the task (block 565). For example, after the authorization is received and/or while processing the task, heartbeat component 320 (FIG. 3), of first worker 130, may produce a heartbeat. The heartbeat may indicate that the application is being used to process the task. Heartbeat component 320 may transmit, via second network 150, the heartbeat to licensing server 140. Heartbeat component 320 may receive, via second network 150 and from licensing server 140, a heartbeat response in response to the heartbeat. The heartbeat response may indicate whether first worker 130 remains authorized to continue using the application to process the task. Heartbeat component 320 may determine whether to continue processing the task based on the heartbeat response.

If the worker remains authorized to continue processing the task (block 555—YES), process 500 may include producing a new heartbeat (block 550). For example, when heartbeat component 320 determines that first worker 130 remains authorized to continue processing the task, task processing component 330 may continue to process the task, and heartbeat component 320 may produce a new heartbeat. Heartbeat component 320 may continuously produce heartbeats until task processing component 330 finishes processing the task or until first worker 130 determines that first worker 130 does not remain authorized to continue processing the task.

If the worker does not remain authorized to continue processing the task (block 565—NO), process 500 may include terminating processing (block 570), transmitting a notification and/or a partial result (block 575), and terminating the application and/or shutting down a worker (block 580). For example, when heartbeat component 320 determines that first worker 130 does not remain authorized to continue to process the task, first worker 130 may terminate the processing of the task. Thereafter, first worker 130 may transmit a notification and/or a partial result to client device 110. The notification may indicate that the processing of the task was not completed because first worker 130 did not receive authorization to continue to use the application to process the task based on the license associated with the authentication credentials. The partial result may include an output from processing a portion of the task. Afterwards, first worker 130 may terminate the application and/or shutdown first worker 130.

Alternatively, process 500 may include terminating the application and/or shutting down first worker 130 (block 580) when the result of processing the task is transmitted (block 545). For example, first worker 130 may terminate the application and/or shutdown after transmitting the result to client device 110.

Figure 6:
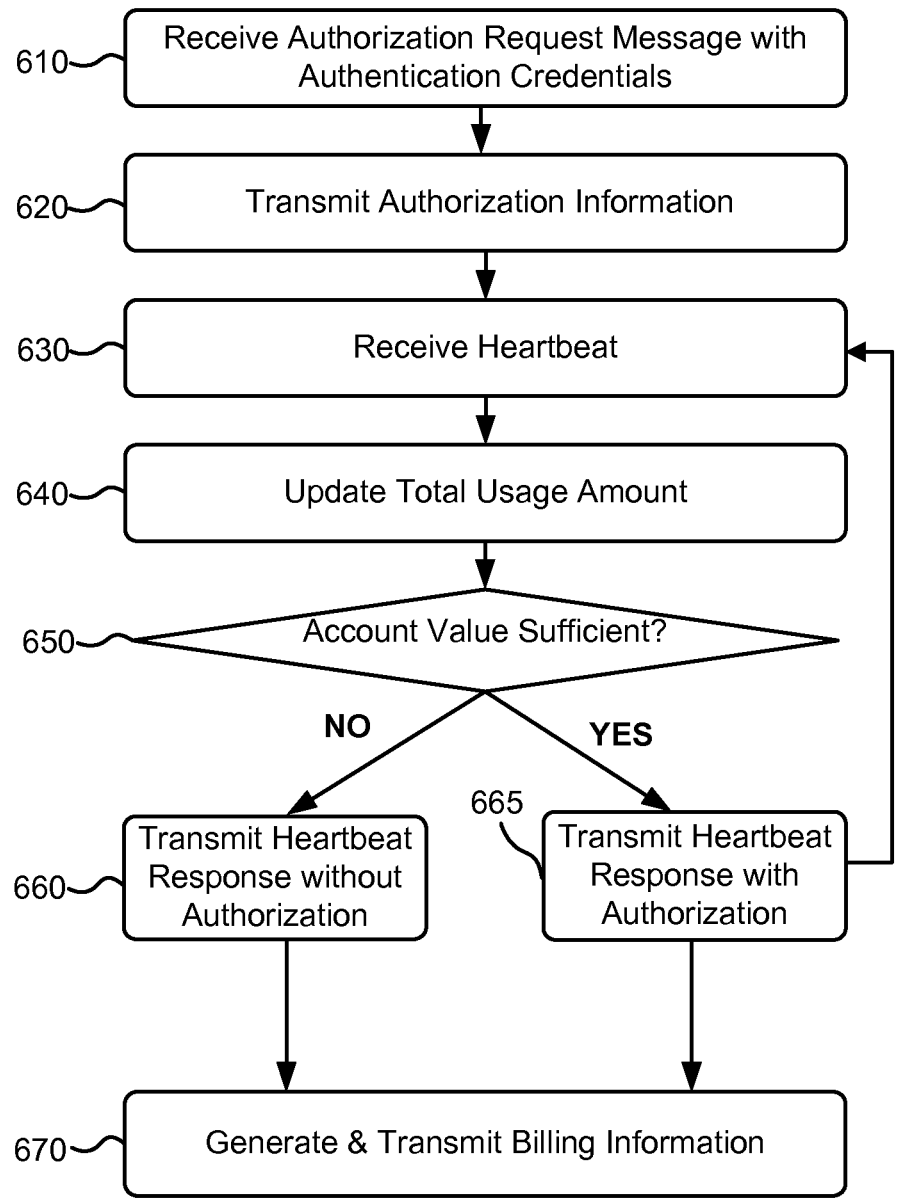
FIG. 6 is a flowchart of an example process for providing authorization based on a license.

FIG. 6 is a flowchart of an example process for providing authorization based on a license. In one implementation, licensing server 140 may perform process 600. In another implementation, a device or collection of devices separate from, or in combination with, licensing server 140 may perform some or all of process 600.

As show in FIG. 6, process 600 may include receiving an authorization request message with authentication credentials (block 610). For example, first worker 130 may receive, via first network 120, a task from client device 110 or another worker (not shown in FIG. 1). In response to receiving the task, first worker 130 may generate an authorization request message, as described above in connection with FIG. 5, and may transmit the authorization request message to license server 140. The authorization request message may include authentication credentials. Authentication component 420 (FIG. 4), of licensing server 140, may receive the authorization request.

Process 600 may also include transmitting authorization information (block 620). For example, authentication component 420 may use the authentication credentials to retrieve licensee information associated with the license from licensee information component 410 (FIG. 4) of license server 140. The licensee information may identify the application that first worker 130 is allowed to use to process a task received from client device 110. Authentication component 420 may determine, based on the licensee information and the authorization request message, whether first worker 130 is authorized to use the application to process the task. In one implementation, to determine whether first worker 130 is authorized to process the task, authentication component 420 may determine whether the authentication credentials are valid. Authentication component 420 may determine that the authentication credentials are valid when the authentication credentials match authentication information stored in association with the license.

In another implementation, the licensee information may include an account value associated with the license. Licensing server 140 may determine an estimate for completing the task. Licensing server 140 may determine, based on the estimate, whether the account value is sufficient for first worker 130 to process the task. Licensing server 140 may determine that first worker 130 is allowed to process the task when the account value is sufficient. For example, the account value may equal a particular amount of money left in an account associated with the license. In one example, the account value may equal $100.00. Licensing server 140 may estimate that $200.00 is required to process the task. Accordingly, in this instance, licensing server 140 may determine that the account value is insufficient. In another example, the account value may equal $200.00. Licensing server 140 may estimate that $100.00 is required to process the task. Accordingly, in this instance, licensing server 140 may determine that the account value is sufficient.

Authentication component 420 may transmit, via second network 150, authorization to first worker 130 when authentication component 420 determines that first worker 130 is allowed to process the task. In one example, authentication component 420 may generate authorization information that includes the authorization, and may transmit the authorization information to first worker 130.

Process 600 may also include receiving a heartbeat (block 630). For example, after receiving the authorization, first worker 130 may initialize the application, and may begin using the application to process the task. While processing the task, first worker 130 may transmit, via second network 150, a heartbeat to licensing server 140. Licensing server 140 may receive the heartbeat. In one example, licensing server 140 may receive a first heartbeat after a first time period. After block 665, as described further below, licensing server 140 may receive a second heartbeat after a second time period. The first time period may equal the second time period.

Process 600 may also include updating a total usage amount (block 640) and determining whether an account value is sufficient (block 650). For example, usage tracker component 430 (FIG. 4), of licensing server 140, may update a total usage amount associated with the license, based on the heartbeat(s) received from first worker 130. In one implementation, usage tracker component 430 may determine, based on the heartbeat(s), a period of time that the application has been used to process the task. Licensing server 140 may calculate a charge for the use of the application based on the period of time and/or one or more cost factors. The cost factors may include, for example, one or more of: a time of day of the use of the instance of the application, a geographic location of client device 110, a geographic location of first worker 110, terms of the license, ownership information associated with client device 110, or an identity of an owner of a private network that includes first worker 130. Usage tracker component 430 may increase the total usage amount by an amount of the charge. Usage tracker component 430 may determine whether the account value, associated with the license, is sufficient based on the updated total usage amount.

In other implementations, usage tracker component 430 may use one or more other ways to update the total usage amount. For example, usage tracker component 430 may track a time period from when licensing server 140 transmitted the authorization to first worker 130. Usage tracker component 430 may update the total usage amount based on the time period and/or one or more other time periods tracked for other workers (e.g., not shown in FIG. 1) that are processing tasks based on the license. Usage tracker component 430 may determine whether an account value is sufficient based on whether the total usage amount is less than the account value (e.g., by a particular amount).

If the account value is not sufficient (block 650—NO), process 600 may include transmitting a heartbeat response without authorization (block 660). For example, usage tracker component 430 may determine that the account value is not sufficient when the updated total usage amount is equal to or greater than the account value or a threshold associated with the account value. The threshold may equal a difference between the account value and a particular buffer value. When usage tracker component 430 determines that the account value is not sufficient, usage tracker component 430 may generate a heartbeat response that indicates that first worker 130 is not authorized to continue using the application to process the task. Usage tracker component 430 may transmit the heartbeat response, with the non-authorization indication, to first worker 130. In response to the heartbeat response, first worker 130 may terminate the processing of the task, may terminate the application, and/or may shutdown first worker 130.

If the account value is sufficient (block 650—YES), process 600 may include transmitting a heartbeat response with authorization (block 665). For example, usage tracker component 430 may determine that the account value is sufficient when the updated total usage amount is less than the account value or the threshold associated with the account value. When usage tracker component 430 determines that the account value is sufficient, usage tracker component 430 may generate a heartbeat response that indicates that first worker 130 is authorized to continue using the application to process the task. Usage tracker component 430 may transmit the heartbeat response, with the authorization indication, to first worker 130. In response to the heartbeat response, first worker 130 may continue to use the application to process the task.

Returning to FIG. 6, process 600 may also include generating and transmitting billing information (block 670). For example, licensing server 140 may continue receiving heartbeats (block 630) at periodic intervals, from first worker 130, until licensing server 140 transmits, to first worker 130, the heartbeat response with the non-authorization indication or until first worker 130 finishes processing the task. Licensing server 140 may generate billing information based on the total usage amount and/or other cost factors described above. The billing information may include a charge for the use of instances of the application. In one example, licensing server 140 may calculate a charge based on a unit of time. For example, licensing server 140 may calculate a charge for the use of the application at a rate of $10 per minute. If first worker 130 processes the task for 10 minutes, the charge may equal $100.

Additionally, or alternatively, licensing server 140 may further generate the billing information based on application startup information that is received, for example, at a time when the application is initialized. The application startup information may specify how the licensee should be billed for processing of the task by first worker 130. The application startup information may include, for example, the rate and/or when the billing information should be generated and send to the client.

In one implementation, licensing server 140 may generate the billing information on a per task basis, on a time period basis (e.g., monthly), or at other times. Licensing server 140 may transmit the billing information to client device 110 (e.g., via email) or to the licensee in another manner.

Licensing server 140 may also receive, while receiving heartbeats from first worker 130, heartbeats from one or more other workers (not shown in FIG. 1) that are, for example, processing sub-tasks of the task. Licensing server 140 may update the total usage amount based on the heartbeats from the other workers. Licensing server 140 may also determine whether the other workers are authorized to continue to process the sub-tasks based on the total usage amount and the account value associated with the license or based on values associated with another license, for a different application, associated with client device 110 and/or the user.

Examples of Processing a Task

While the above description focused on the components in environment 1100, other arrangements of components are possible. The examples below provide two additional example environments in which systems and methods described herein may be implemented. Other arrangements of components are possible.

FIGS. 7A-7F illustrate an example of processing a task in an environment 700. As shown in FIGS. 7A-7F, environment 700 may include, for example, client device 110, first worker 130, licensing server 140, a first network 710, a second network 720, a second worker 730, and a third network 750. In practice, environment 700 may include additional components, fewer components, different components, or differently arranged components than are shown in FIG. 7. Additionally, or alternatively, one or more of the components of environment 700 may perform one or more functions described as being performed by another one or more of the components of environment 700.

Client device 110, first worker 130, licensing server 140, first network 710, and third network 750 of FIG. 7 may correspond to first worker 130, licensing server 140, first network 120, and second network 150 of FIG. 1, respectively. Second network 720 and second worker 730 may include a same type of components and/or perform same types of functions as first network 710 and first worker 130, respectively. First worker 130 and second worker 730 may operate simultaneously and/or independently of one another.

In this example, first worker 130 may be accessible via first network 710 and second worker 730 may be accessible via second network 720. License server 140 may be accessible via third network 750. In this example, client device 110 may require for first worker 130 to use a first application to process a task. The first application may require second worker 730 to use a second application to process a portion of the task.

Figure 7A:
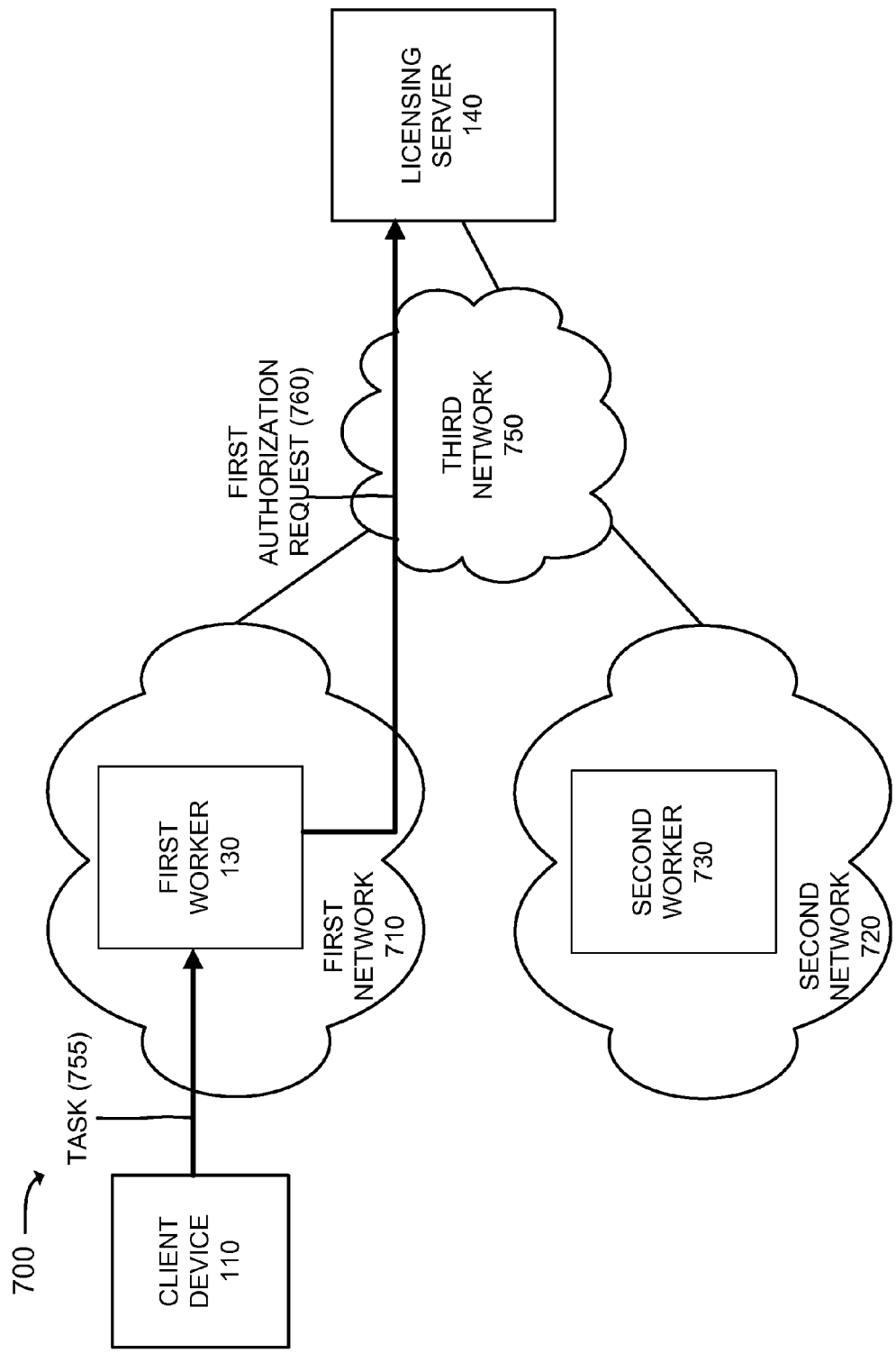
FIGS. 7A-7F illustrate an example of processing a task.
Figure 7B:
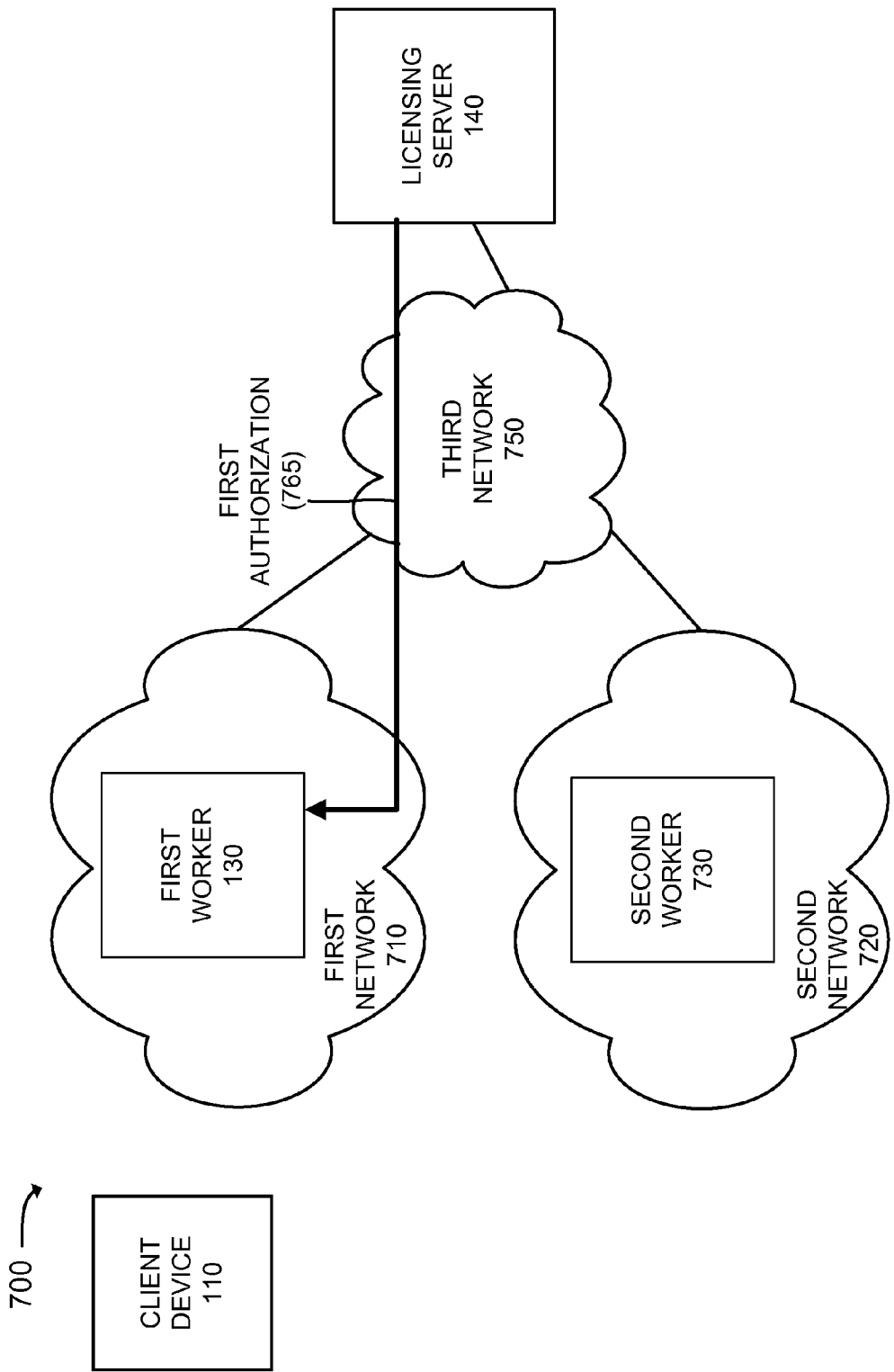
Figure 7C:
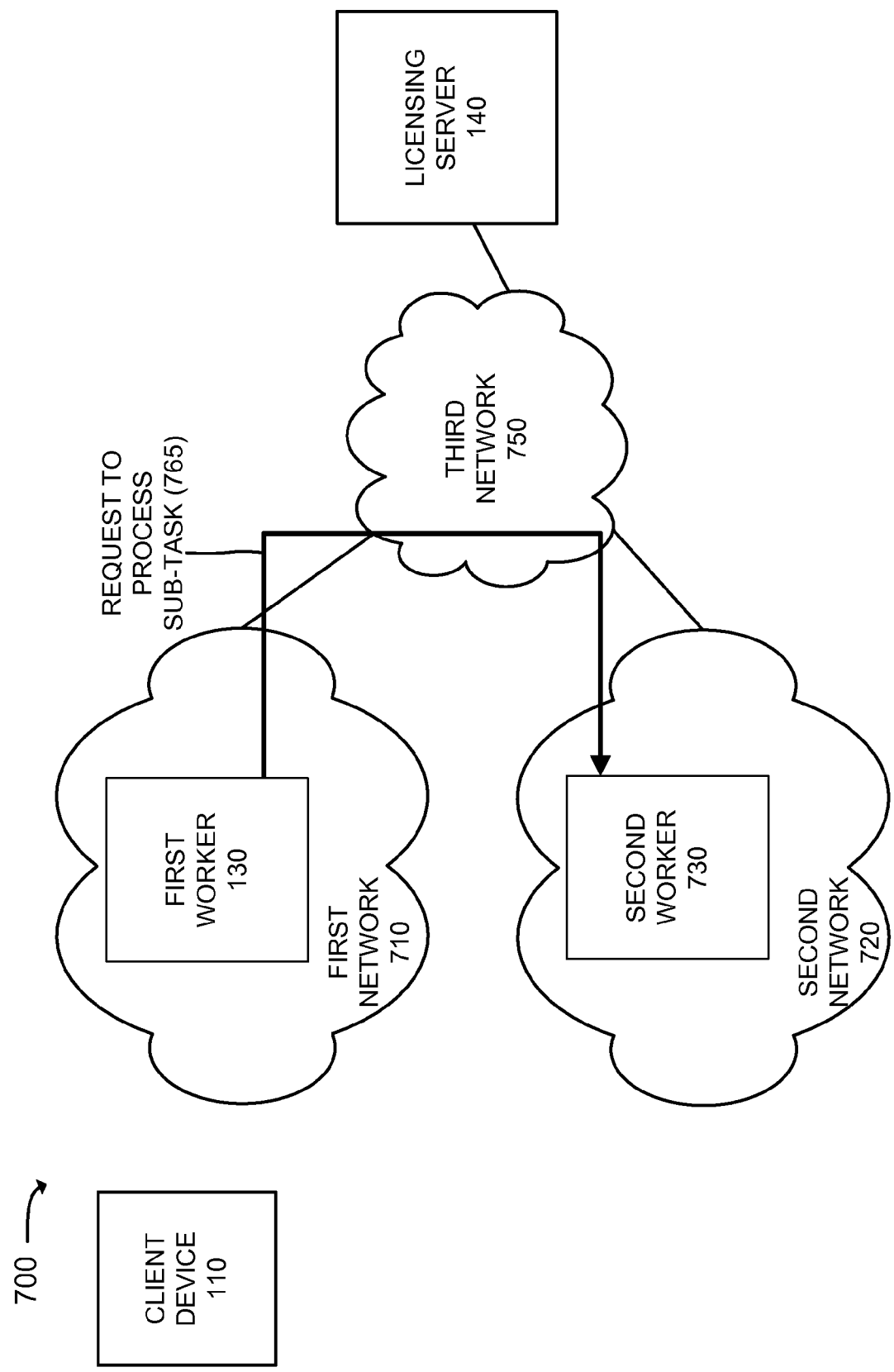
Figure 7D:
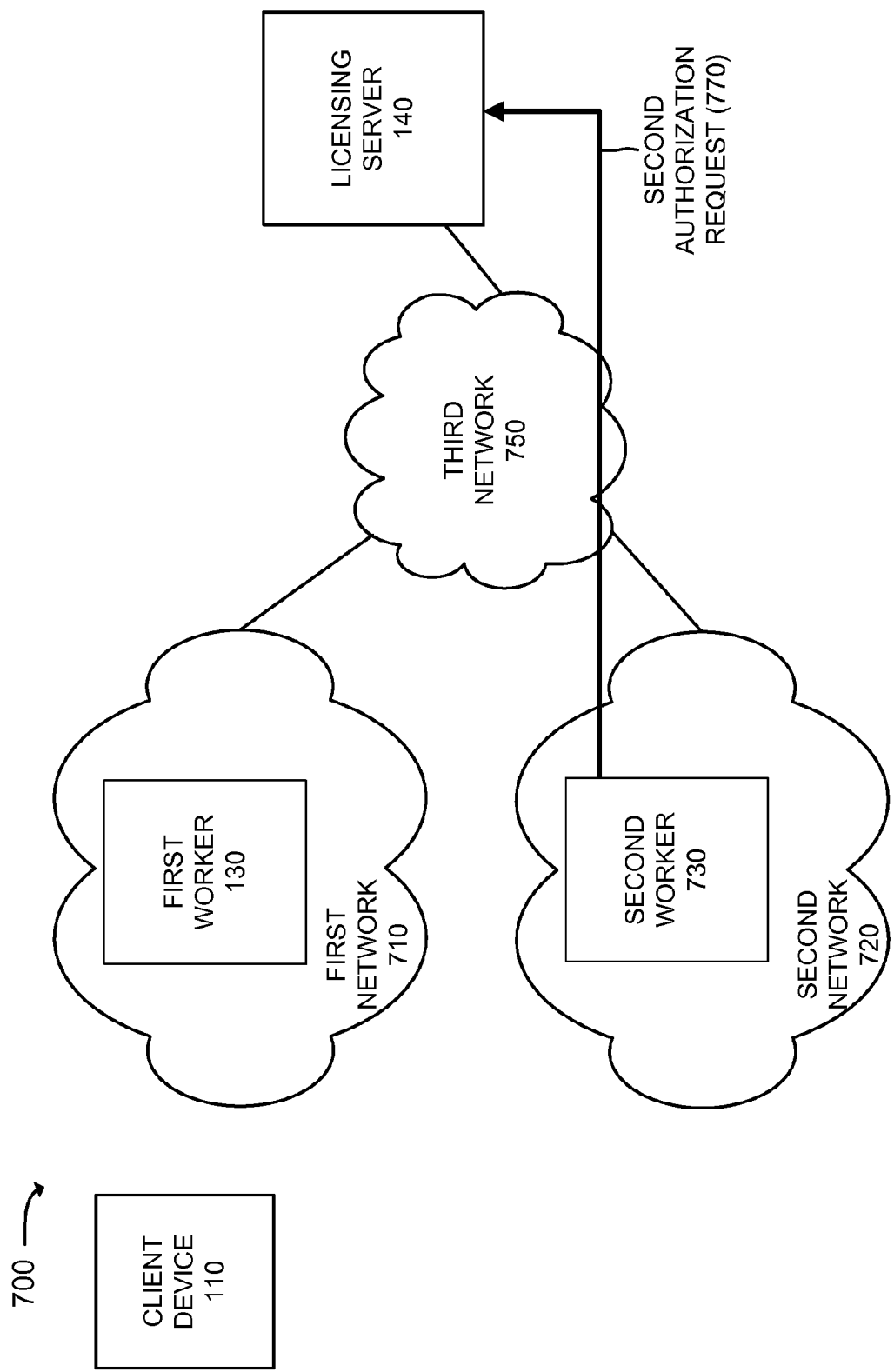

As shown in FIG. 7A, a user may use a client device 110 to create a task 755. Client device 110 may transmit task 755, to first worker 130 via first network 710. Task 755 may include authentication credentials associated with the user or client device 110. First worker 130 may generate a first authorization request 760 based on task 755. First authorization request 760 may request authorization to use a first application to process task 755 based on a first license (e.g., a perpetual license). First authorization request 760 may also include the authentication credentials. First worker 130 may transmit, via third network 750, first authorization request 760 to licensing server 140.

Licensing server 140 may receive first authorization request 760 directly from first worker 130 or via a first web service. Licensing server 140 may determine, based on the authentication credentials included in first authorization request 760, that first worker 130 is authorized to use the first application to process task 755 based on the first license. Accordingly, licensing server 140 may generate and transmit, via third network 750, a first authorization 765 (FIG. 7B) to first worker 130. In response to first authorization 765, first worker 130 may use the first application to process task 755. While processing task 755, first worker 130 may continuously transmit heartbeats (not shown in FIGS. 7A-7E) to licensing server 140 to ensure that first worker 130 remains authorized to use the first application to process task 755, as described above with reference to FIG. 5.

Assume that the first application of first worker 130 determines that a second application is required to process a sub-task of task 755. First worker 130 may generate a request 765 (FIG. 7C) for the second application to process the sub-task on behalf of the first application based on the second license. Request 765 may include the sub-task and the authentication credentials. First worker 130 may transmit, via third network 750, request to process sub-task 765 to second worker 730. Second worker 730 may generate a second authorization request 770 (FIG. 7D) based on request 765. Second authorization request 770 may also include the authentication credentials. Second authorization request 770 may request authorization to process the sub-task by using the second application and/or based one second license. The second license may authorize workers to use the second application to process tasks or sub-tasks associated with the licensee, and the first license may authorize workers to use the first application to process tasks or sub-tasks associated with the licensee. The terms of the first license and the second license may be different. Second worker 130 may transmit, via third network 750, second authorization request 770 to licensing server 140.

Figure 7E:
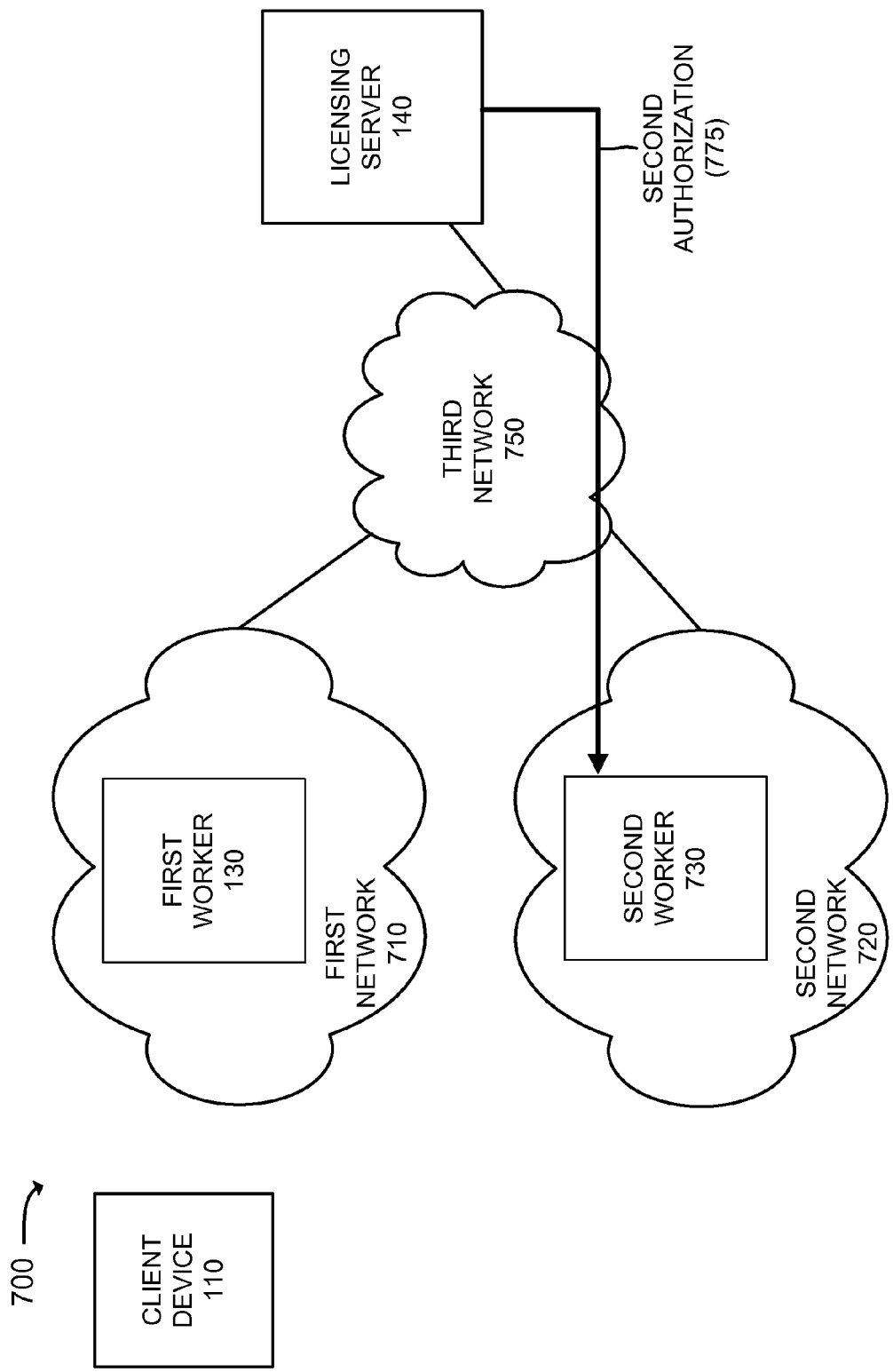

Licensing server 140 may receive second authorization request 770 by using the first web service or a second web service. Licensing server 140 may determine, based on the authentication credentials included in second authorization request 770, that second worker 730 is authorized to use the second application to process the sub-task based on the second license. Accordingly, licensing server 140 may generate and transmit, via third network 750, a second authorization 775 to second worker 730 (FIG. 7E). Second worker 730 may receive second authorization 775 by using the first web service or the second web service. In response to second authorization 775, second worker 730 may use the second application to process the sub-task. While processing the sub-task, second worker 730 may continuously transmit heartbeats to licensing server 140 to ensure that second worker 130 remains authorized to process sub-task 830 using the second application.

Figure 7F:
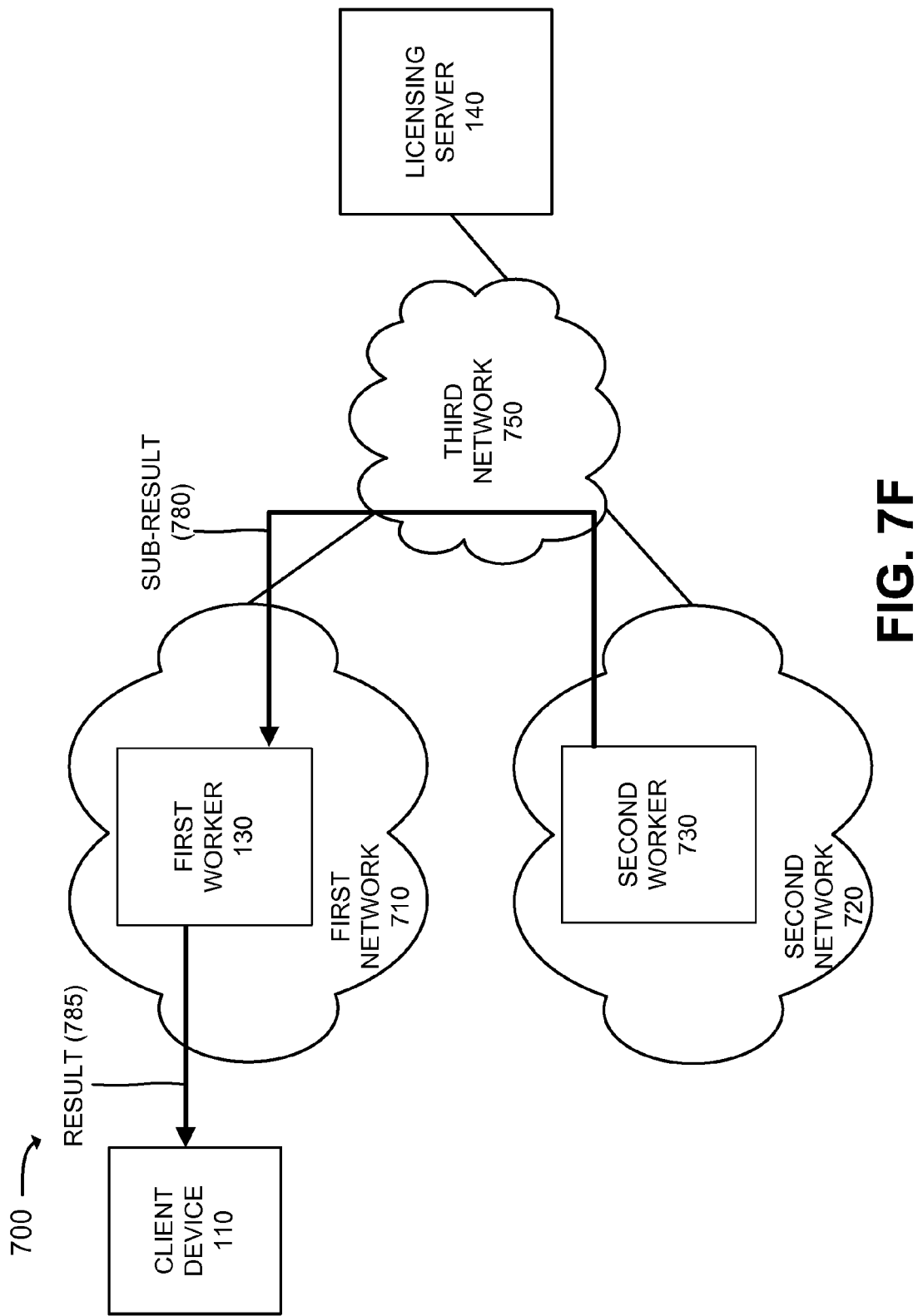

After processing the sub-task, the second application of second worker 730 may produce a sub-result 780 (FIG. 7F). The second application of second worker 230 may transmit, via third network 750, sub-result 780 to first worker 130. The first application of first worker 130 may receive sub-result 780, and may complete processing task 755 based on sub-result 780. After processing task 755, the first application of first worker 130 may produce a result 785 (FIG. 7F) based on the processing of task 755. First worker 130 may transmit result 785 to client device 110.

FIGS. 8A-8D illustrate an example of processing a task in an environment 800. As shown in FIGS. 8A-8D, environment 800 may include one or more of the following components: client device 110, first worker 130, licensing server 140, second network 720, second worker 730, a first network 810, a web service 820, and third network 750. In practice, environment 800 may include additional components, fewer components, different components, or differently arranged components than are shown in FIG. 8. Additionally, or alternatively, one or more of the components of environment 800 may perform one or more functions described as being performed by another one or more of the components of environment 800.

Client device 110, first worker 130, licensing server 140, second network 720, second worker 730, and third network 750 of FIG. 7 may correspond to client device 110, first worker 130, licensing server 140, second network 720, second worker 730, and third network 750 of FIG. 7, respectively. First network 810 may include client device 110, which may execute application 160.

In this example, first worker 130 may be accessible via web service 820, second worker 730 may be accessible via second network 720, and client device 110 may be accessible via first network 810. License server 140 may be accessible via third network 750. In this example, application 160 of client device 110 may require for first worker 130 to use a first application to process a task and for second worker 730 to use a second application to process a portion of the task.

Figure 8A:
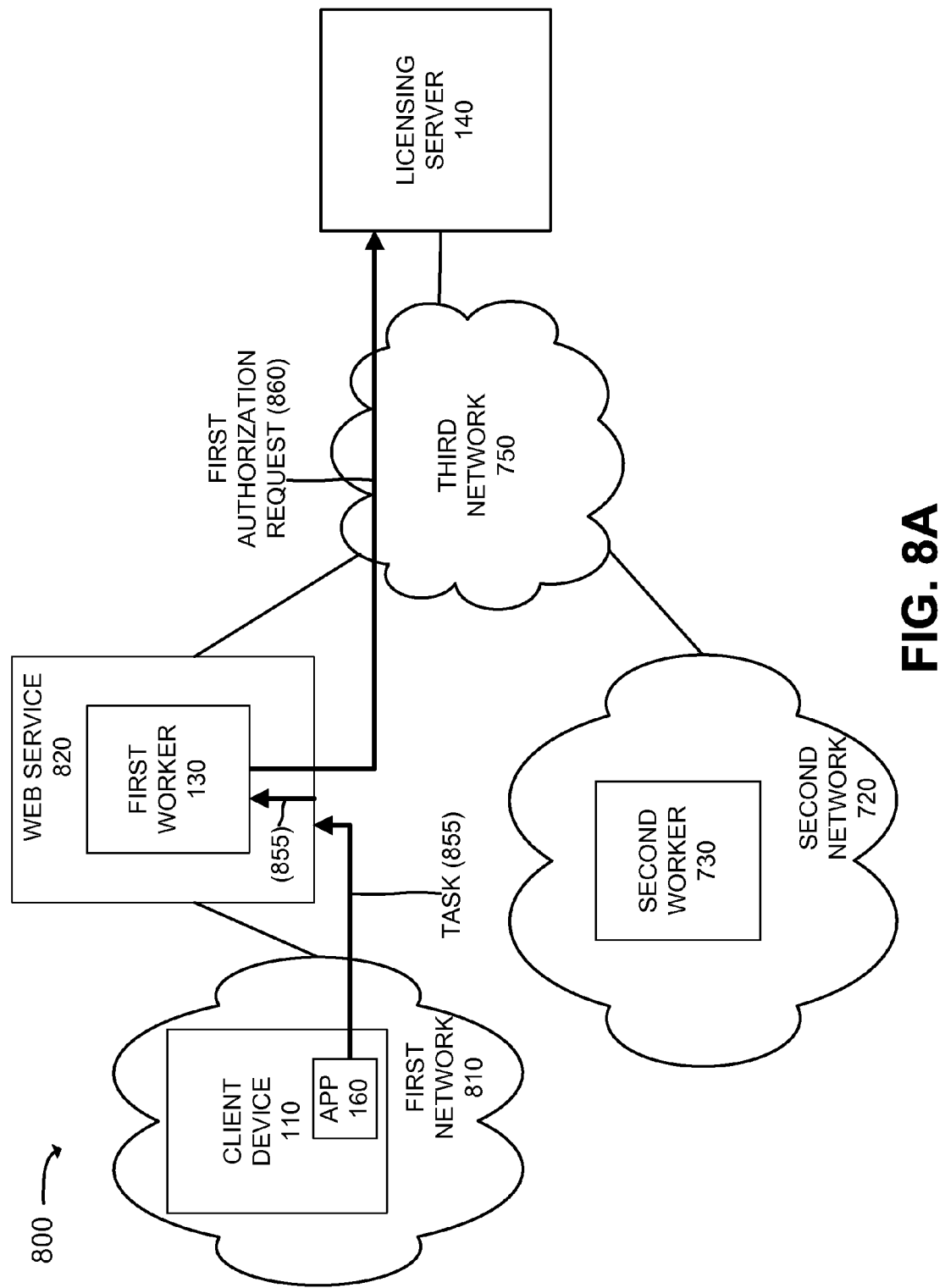
FIGS. 8A-8D illustrate another example of processing a task.
Figure 8B:
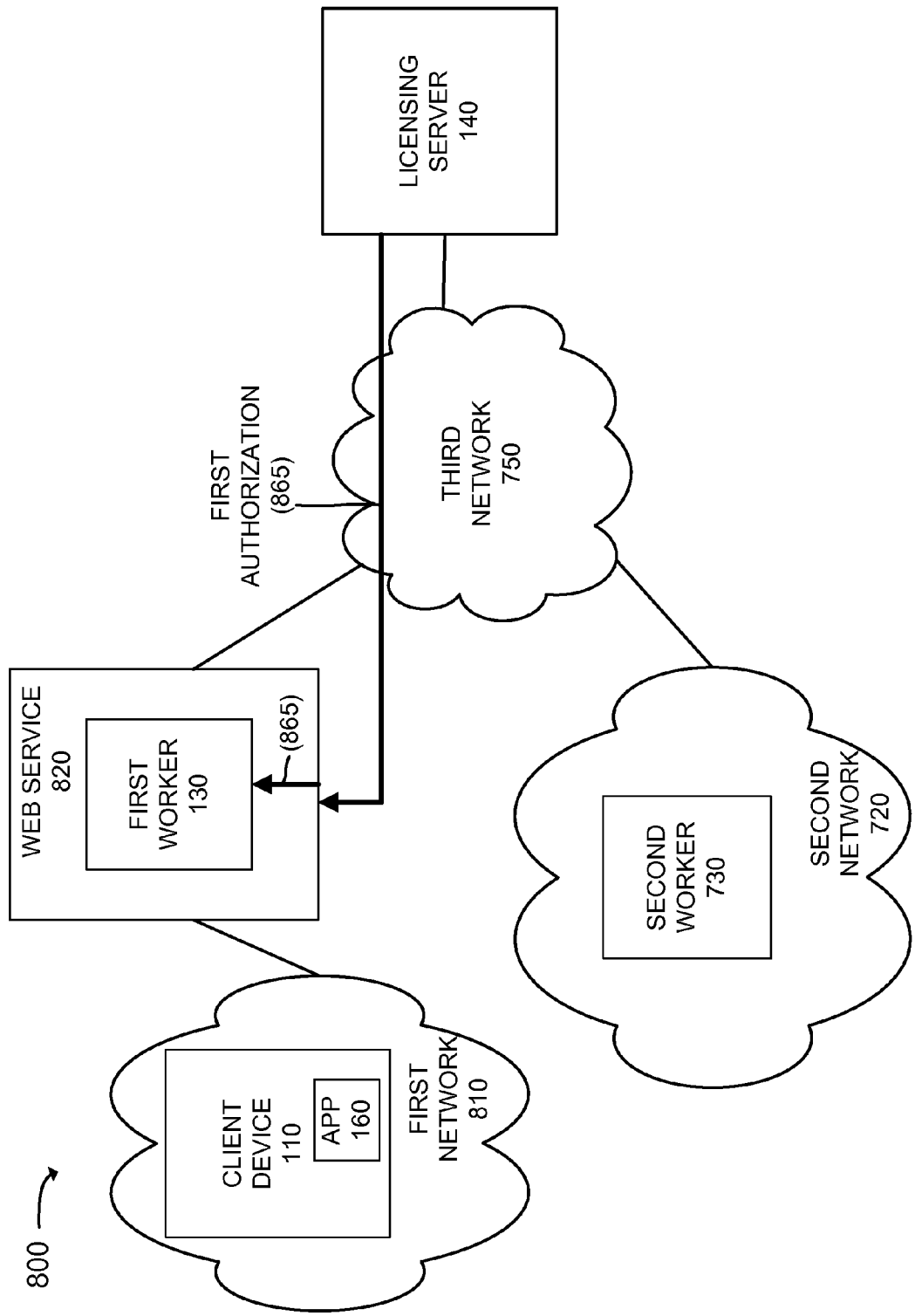

For example, as shown in FIG. 8A, application 160 may create a task 855. Application 160 may transmit, via first network 810, task 855 to web service 820. Web service 820 may receive task 855 from application 160, and may forward task 855 to first worker 130. Task 885 may include authentication credentials associated with client device 110. First worker 130 may generate a first authorization request 860 based on the authentication credentials. First worker 130 may use web service 820 to forward, via third network 750, first authorization request 860 to licensing server 140. Licensing server 140 may determine, based on the authentication credentials included in first authorization request 860, that first worker 130 is authorized to process task 855. Accordingly, licensing server 140 may generate and transmit, via third network 750, first authorization 865 (FIG. 8B). Web service 820 may receive first authorization 865, and may forward first authorization 865 to first worker 130.

In one implementation, first worker 130 may determine that a second application is required to process a sub-task of task 855. Task 855 may further include information that authorizes the second application to process the sub-task based on a second license (e.g., a non-perpetual license). Accordingly, first worker 130 may generate a request 870 to process sub-task based on the sub-task and the information that that authorizes the second application to process the sub-task. First worker 130 may transmit, via third network 750, request 870 to second worker 730. In response to request 870, second worker 730 may, based on the information that authorizes the second application to process the sub-task, use the second application to process the sub-task 830 in accordance with the second license.

Figure 8C:
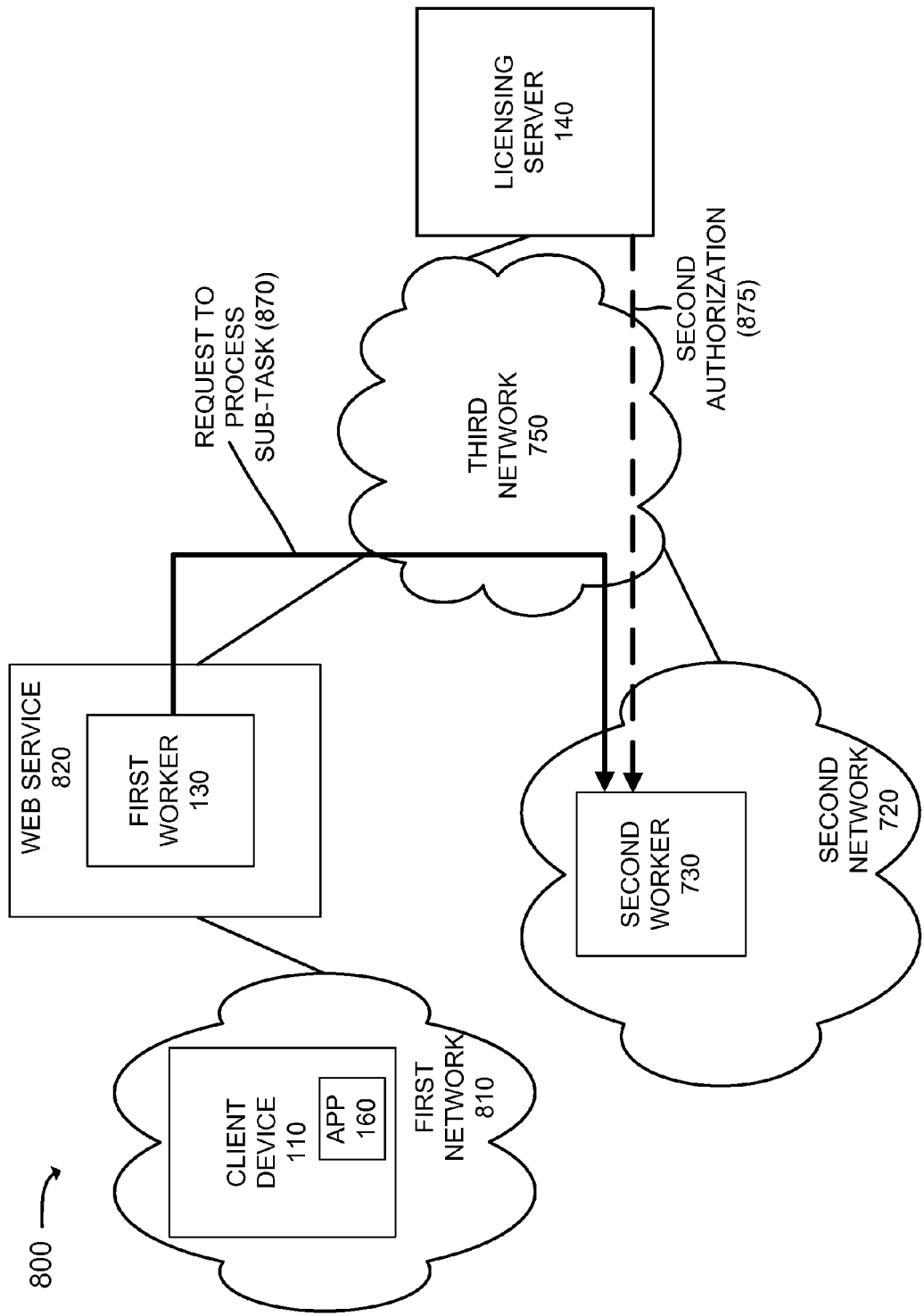

In another implementation, before generating first authorization request 860, first worker 130 may determine that additional processing power (e.g., another worker) is required to process a sub-task of task 855. First worker 130 may include first authorization request 860 in a second authorization request for licensing server 140 to provide authorization to second worker 730 to process the sub-task. When licensing server 140 determines that first worker 130 is authorized to process task 855, licensing server 140 may also determine that second worker 730 is authorized to process the sub-task. Licensing server 140 may generate first authorization 865 and a second authorization 875 (FIG. 8C). Licensing server 140 may transmit first authorization 865 to first worker 130, as described above, and may transmit second authorization 875 to second worker 730. After first worker 130 receives first authorization 865, first worker 130 may generate request 870 that directs second worker 130 to process the sub-task based on second authorization 875. First worker 130 may transmit request 870 to second worker 730. In response to request 870, second worker 730 may process the sub-task based on second authorization 875.

Figure 8D:
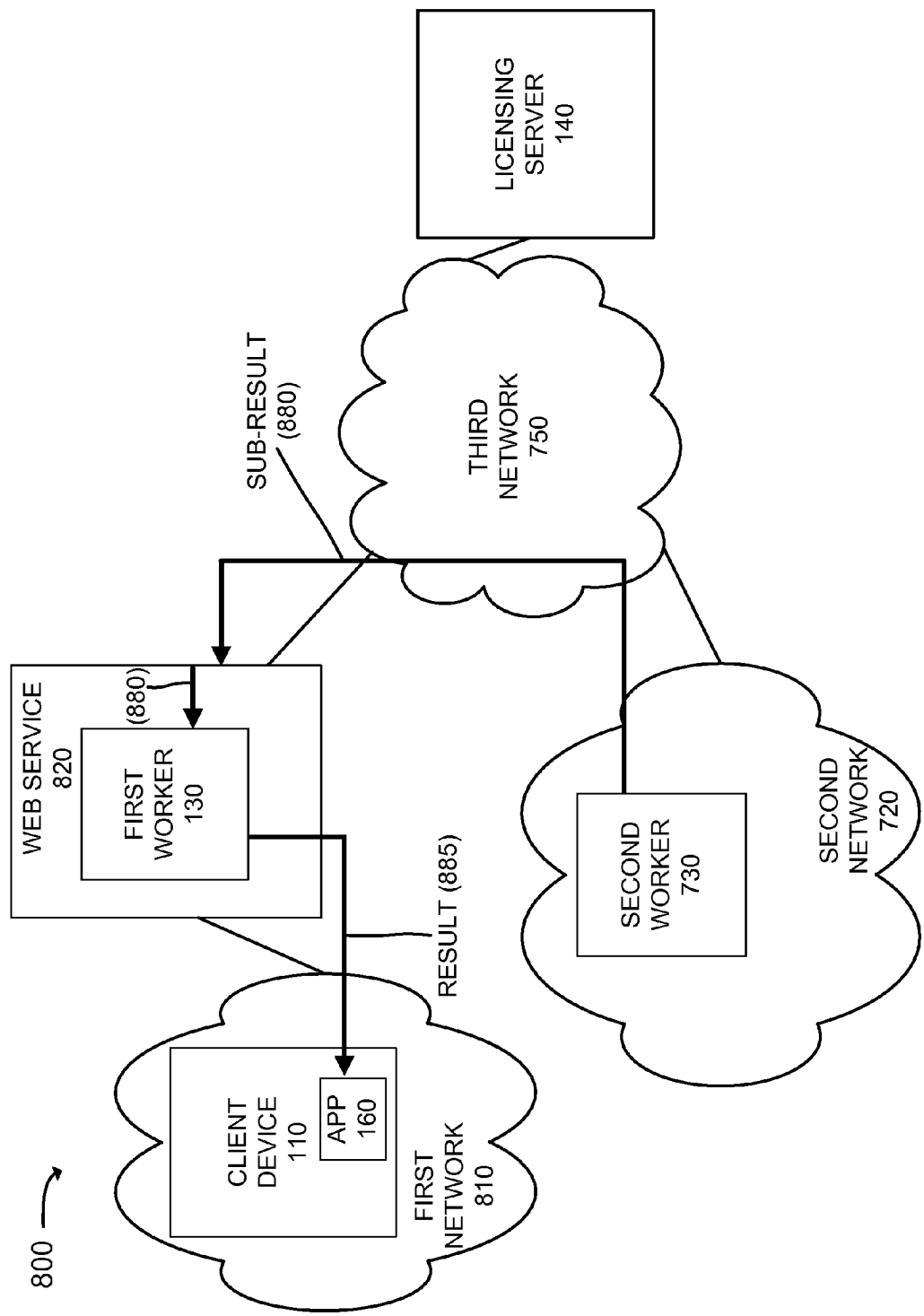

After processing the sub-task, second worker 730 may produce a sub-result 880 (FIG. 8D). Second worker 730 may transmit, via third network 750, sub-result 880 to first worker 130. Web service 820 may receive sub-result 880, and may forward sub-result 880 to first worker 130. First worker 130 may produce a result 885 (FIG. 8D) based on processing of task 855 and/or based on sub-result 880. First worker 130 may transmit result 885 to application 160 of client device 110.

CONCLUSION

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to processes of FIGS. 5 and 6, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Further, certain portions, described herein, may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving a task,
      the task being received over a first network,
      the task including authentication credentials,
      the task being processed using an application, and
      the receiving the task being performed by a computing device;
   sending the authentication credentials to a licensing server,
      the authentication credentials being sent over a second network, the second network being different than the first network,
      the authentication credentials being sent prior to processing the task using the application, and
      the sending the authentication credentials being performed by the computing device;
   receiving authorization information,
      the authorization information being received over the second network,
      the authorization information authorizing the application to process the task, and
      the receiving the authorization information being performed by the computing device;
   generating, at a first time and based on receiving the authorization information, one or more heartbeat messages,
      the generating the one or more heartbeat messages being performed by the computing device;
   periodically transmitting, over the second network and to the licensing server, the one or more heartbeat messages,
      the periodically transmitting the one or more heartbeat messages being performed by the computing device;
   receiving, over the second network and at a second time, an indication from the licensing server that the task is to be terminated,
      the second time occurring after the first time,
      the indication being based on the one or more heartbeat messages, and
      the receiving the indication being performed by the computing device; and
   terminating, based on the received indication, the task,
      the terminating being performed by the computing device.

2. The method of claim 1, where
the one or more heartbeat messages are transmitted while the application is processing the task, and
the one or more heartbeat messages are used to determine whether the application remains authorized to continue processing the task.

3. The method of claim 1, where the one or more heartbeat messages are used to determine billing information for the application.

4. The method of claim 3, further comprising:
using application startup information in conjunction with the one or more heartbeat messages to determine the billing information for the application.

5. The method of claim 1, further comprising:
receiving, at a third time, a response from the licensing server, where
the response indicates whether the application remains authorized, and
the third time occurs before the second time.

6. The method of claim 1, further comprising:
producing a result based on the processing of the task.

7. The method of claim 1, where the authentication credentials include at least one of:
a user name,
a password,
a token,
a digital certificate, or
a biometric identifier.

8. The method of claim 1, where the application requires a valid license to process the task.

9. The method of claim 1, further comprising:
sending the authentication credentials when the application is initialized.

10. The method of claim 1, further comprising:
sending the authentication credentials prior to initializing the application.

11. The method of claim 8, where the license identifies one or more rights.

12. The method of claim 1, further comprising:
processing the authorization information,
where, when generating the one or more heartbeat messages, the method includes:
a generating the one or more heartbeat messages when the processing indicates that the application is authorized to process the task.

13. The method of claim 1, where the task is included in a job.

14. The method of claim 13, where the task is one of a plurality of tasks included in the job.

15. The method of claim 14, where
the task is associated with a first license, and another of the plurality of tasks is associated with a second license.

16. The method of claim 1, where the task is received from a scheduler operating on behalf of a client.

17. The method of claim 1, where the authorization includes license information.

18. The method of claim 1, further comprising:
providing the authorization to the application.

19. The method of claim 1, further comprising:
checking the authorization using the application; and
commencing billing subsequent to the checking.

20. A device comprising:
a memory to store instructions; and
a processor to execute the instructions to:
receive a task,
the task being received over a first network,
the task including authentication credentials, and
the task being processed using an application;
send the authentication credentials to a licensing server,
the authentication credentials being sent over a second network, the second network being different than the first network, and
the authentication credentials being sent prior to processing the task using the application;
receive authorization information,
the authorization information being received over the second network, and
the authorization information authorizing the application to process the task;
generate, at a first time and based on receiving the authorization information, one or more heartbeat messages;
periodically transmit, over the second network and to the licensing server, the one or more heartbeat messages;
receive, over the second network and at a second time, an indication from the licensing server that the task is to be terminated,
the second time occurring after the first time, and
the indication being based on the one or more heartbeat messages; and
terminate, based on the received indication, the task.

21. The device of claim 20, where
the one or more heartbeat messages are transmitted while the application is processing the task, and
the one or more heartbeat messages are used to determine whether the application remains authorized to continue processing the task.

22. The device of claim 20, where the one or more heartbeat messages are used to determine billing information for the application.

23. The device of claim 22, where the processor is further to:
use application startup information in conjunction with the one or more heartbeat messages to determine the billing information for the application.

24. The device of claim 20, where the processor is further to:
receive, at a third time, a response from the licensing server, where
the response indicates whether the application remains authorized, and
the third time occurs before the second time.

25. The device of claim 20, where the processor is further to:
produce a result based on the processing of the task.

26. The device of claim 20, where the authentication credentials include at least one of:
a user name,
a password,
a token,
a digital certificate, or
a biometric identifier.

27. The device of claim 20, where the application requires a valid license to process the task,
the license identifying one or more rights.

28. The device of claim 20, where the processor is further to:
send the authentication credentials when the application is initialized.

29. The device of claim 20, where the processor is further to:
send the authentication credentials prior to initializing the application.

30. The device of claim 20, where the processor is further to:
process the authorization information,
where the processor, when generating the one or more heartbeat messages, is further to:

generate the one or more heartbeat messages when the processing indicates that the application is authorized to process the task.

31. The device of claim 20, where
the task is associated with a first license, and
another task is associated with a second license.

32. The device of claim 20, where the task is received from a scheduler operating on behalf of a client.

33. The device of claim 20, where the authorization includes license information.

34. The device of claim 20, where the processor is further to:
provide the authorization to the application.

35. The device of claim 20, where the processor is further to:
check the authorization using the application; and
commence billing subsequent to the checking.

36. A non-transitory computer-readable medium storing instructions, the instructions comprising:
one or more instructions which, when executed by a processor, cause the processor to:
receive a task,
the task being received over a first network,
the task including authentication credentials, and
the task being processed using an application;
send the authentication credentials to a licensing server,
the authentication credentials being sent over a second network, the second network being different than the first network, and
the authentication credentials being sent prior to processing the task using the application;
receive authorization information,
the authorization information being received over the second network, and
the authorization information authorizing the application to process the task;
generate, at a first time and based on receiving the authorization information, one or more heartbeat messages;
periodically transmit, over the second network and to the licensing server, the one or more heartbeat messages;
receive, over the second network and at a second time, an indication from the licensing server that the task is to be terminated,
the second time occurring after the first time, and
the indication being based on the one or more heartbeat messages; and
terminate, based on the received indication, the task.

37. The non-transitory computer-readable medium of claim 36, where
the one or more heartbeat messages are transmitted while the application is processing the task, and
the one or more heartbeat messages are used to determine whether the application remains authorized to continue processing the task.

38. The non-transitory computer-readable medium of claim 36, where the one or more heartbeat messages are used to determine billing information for the application.

39. The non-transitory computer-readable medium of claim 38, where the one or more instructions include:
one or more instructions to use application startup information in conjunction with the one or more heartbeat messages to determine the billing information for the application.

40. The non-transitory computer-readable medium of claim 36, where the one or more instructions include:
one or more instructions to receive, at a third time, a response from the licensing server, where
the response indicates whether the application remains authorized, and
the third time occurs before the second time.

41. The non-transitory computer-readable medium of claim 36, where the one or more instructions include:
one or more instructions to produce a result based on the processing of the task.

42. The non-transitory computer-readable medium of claim 36, where the authentication credentials include at least one of:
a user name,
a password,
a token,
a digital certificate, or
a biometric identifier.

43. The non-transitory computer-readable medium of claim 36, where the application requires a valid license to process the task,
the license identifying one or more rights.

44. The non-transitory computer-readable medium of claim 36, where the one or more instructions include:
one or more instructions to send the authentication credentials when the application is initialized.

45. The non-transitory computer-readable medium of claim 36, where the one or more instructions include:
one or more instructions to send the authentication credentials prior to initializing the application.

46. The non-transitory computer-readable medium of claim 36, where the one or more instructions include:
one or more instructions to process the authorization information,
where the one or more instructions to generate the one or more heartbeat messages include:
one or more instructions to generate the one or more heartbeat messages when the processing indicates that the application is authorized to process the task.

47. The non-transitory computer-readable medium of claim 36, where
the task is associated with a first license, and
another task is associated with a second license.

48. The non-transitory computer-readable medium of claim 36, where the task is received from a scheduler operating on behalf of a client.

49. The non-transitory computer-readable medium of claim 36, where the one or more instructions include:
one or more instructions to provide the authorization to the application.

50. The non-transitory computer-readable medium of claim 36, where the one or more instructions include:
one or more instructions to check the authorization using the application; and
one or more instructions to commence billing subsequent to the checking.

* * * * *